Figure 1:
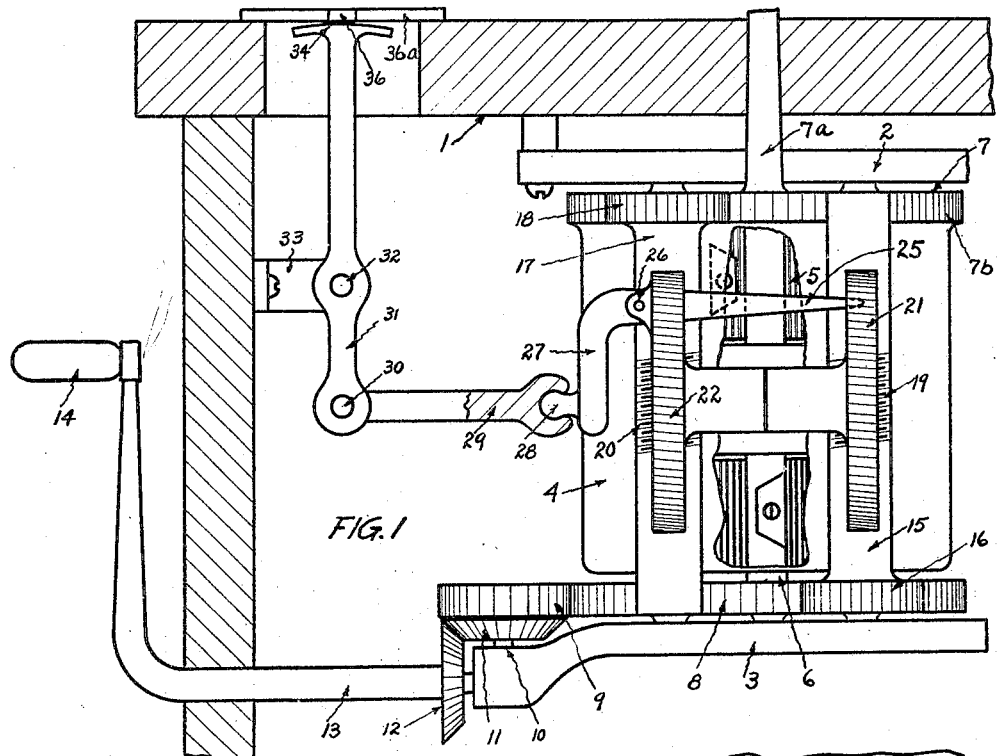

V. V. VEENSCHOTEN.
INDICATING MECHANISM FOR SPRING MOTORS.
APPLICATION FILED JULY 17, 1920.

1,400,644.

Patented Dec. 20, 1921.

INVENTOR
Vincent V. Veenschoten
By
Attorney

UNITED STATES PATENT OFFICE.

VINCENT V. VEENSCHOTEN, OF ERIE, PENNSYLVANIA.

INDICATING MECHANISM FOR SPRING-MOTORS.

1,400,644.

Specification of Letters Patent. Patented Dec. 20, 1921.

Application filed July 17, 1920. Serial No. 397,107.

*To all whom it may concern:*

Be it known that I, VINCENT V. VEENSCHOTEN, a citizen of the United States, residing at Erie, in the county of Erie and State of Pennsylvania, have invented new and useful Improvements in Indicating Mechanism for Spring-Motors, of which the following is a specification.

This invention is designed for use with spring motors and operates to indicate the condition of the spring as to being wound or unwound. The device is particularly useful in connection with spring-actuated phonographs and is so illustrated in the drawings as follows:—

Figure 1 shows a section of a part of a phonograph case showing the spring motor in place.

Figure 2:
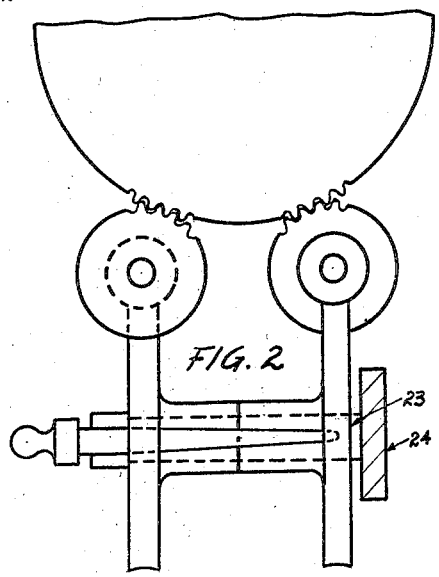

Fig. 2 a plan view of a part of the spring motor with a part of the device mounted in relation thereto.

Figure 3:
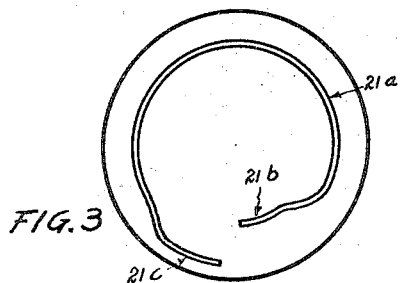

Fig. 3 an elevation of a cam wheel forming a part of the device.

Figure 4:

Fig. 4 a plan view of the indicating plate.

1 marks the phonograph case, 2 and 3 the motor frame which is mounted in the case, 4 the spring barrel, and 5 the spring. As usually constructed the spring is in sections. One end of the spring is connected to a shaft 6 and the other end of the spring is connected to the barrel 4 which is secured to the end wheel 7. The shaft 6 is journaled in the plate 3 and a gear 8 is fixed on the shaft 6. The gear 8 is driven from a pinion 9 mounted on a shaft 10. A beveled gear 11 also mounted on the shaft 10 meshes with a beveled gear 12. The beveled gear 12 is mounted on a crank shaft 13. The crank shaft 13 extends to without the case and the spring is re-wound through a crank 14. The usual phonograph post 7ª receives motion from the wheel 7 through a gearing (not shown) and is driven in the usual manner through the action of the spring 5. Thus the shaft 6 forms the winding or driving means for the spring and the post 7ª the device which is driven by the spring. It will be noted, therefore, with each winding up of the spring the gear 8 is rotated and as the spring runs down, and it is unwound the wheel 7 is rotated. If, therefore, the spring is wound completely the gear 8 will have a certain relation to the wheel 7. On the other hand if the spring is unwound the wheel 7 will have moved with relation to the wheel 8 a pre-determined distance so that this differential relation between the gear 8 and wheel 7 will indicate at all times the condition of the spring and it is only necessary to carry this difference to some readable indicating mechanism to effect the desired result. This is accomplished in a very simple and effective manner. A gear 7ᵇ is formed on the periphery of the wheel 7. A shaft 15 is mounted between the plates 2 and 3. A pinion 16 is fixed on the shaft 15 and meshes with the gear 8. A similar shaft 17 is journaled between the plates 2 and 3 and it is provided with a pinion 18 which meshes with the gear 7ᵇ. From this it will be seen that the gear 16 has a relation to the winding gear 8 and the gear 18 a relation to the wheel 7.

A worm 19 is arranged on the shaft 15. A worm 20 is arranged on the shaft 17. The worms 19 and 20 mesh with the worm gears 21 and 22 respectively, these gears being mounted on a shaft 23 carried by a post 24 on the frame. A lever 25 is pivotally mounted by means of a pin 26 on the gear 22, the lever extending through the gear. The end of this lever extends into a cam slot 21ª arranged in the face of the gear 21. The lever is provided with a bell crank arm 27. This is provided with a ball 28 arranged at the axis of the wheel 22 and this ball is arranged in a socket in a link 29 forming a ball and socket joint with said link. The link 29 is connected by a pin 30 with a rock arm 31. The rock arm is pivotally mounted on a pin 32. It is provided at its upper end with an indicating plate 34, the plate having the indicating characters "Stop", "Play" and "Wind" as indicated in Fig. 4. These characters are displayed through an opening 36 in a plate 36ª arranged on the top of the case.

The cam slot 21ª to an extent indicating the normal winding tension of the spring is such as to hold the rock lever 31 in a vertical position and to display the word "Play". The cam slot 21ª has an inwardly extending portion 21ᵇ which will swing the lever 25 so as to rock the rock arm 31 to bring the word "Wind" into the slot 36. On the other hand the opposite end of the slot 21ª has an outwardly extending portion 21ᶜ which will swing the rock lever 25 so as to rock the arm 31 to a position to bring the word "Stop" into the opening 36, the idea being to indicate that the spring is thoroughly wound and the winding should stop.

It will be observed that the lever 25 will move with the wheel 22 as the wheel 7 is rotated with the unwinding of the spring. At this time the gear 8 having performed its function in winding the spring will be normally stationary and in consequence the wheel 21 will be stationary. The lever 25, therefore, will traverse the cam slot 21ª in what may be termed a reverse direction. As the spring is unwound it will have reached the end of the cam slot. When the spring is re-wound the gear 22 will be normally stationary or at least comparatively so with relation to the movement of the gear 8 by which the spring is wound and the gear 21 will be rotated as the spring is wound so as to advance the gear 21 and carry the cam slot 21ª along the end of the lever 25 so as to locate the lever in the initial position in said slot which ordinarily would be in the extension 21ᶜ.

If desired the cam slot may be in a different form so as to indicate the condition of the spring at intermediate positions but I prefer to have the form shown as it is believed it will be less confusing to the average operator.

What I claim as new is:—

1. In an indicating mechanism for spring motors, the combination of a spring; a winding mechanism for winding said spring; a wheel connected with the winding mechanism; means driven by the spring; a wheel connected with the driven means; a lever mounted on one wheel; means on the other wheel acting on the lever with a movement of either wheel; and indicating devices actuated by the lever.

2. In an indicating mechanism for spring motors, the combination of a spring; a winding mechanism for the spring; mechanism driven by the spring; a lever carried with one of said mechanisms and acted upon through a connection with the other of said mechanisms; and indicating devices actuated by the lever.

3. In an indicating mechanism for spring motors, the combination of a spring; a winding mechanism for winding said spring; mechanism driven by said spring; a cam carried in connection with one of said mechanisms; devices carried in connection with the other of said mechanisms and co-acting with the cam as either mechanism is moved; and means indicating the movement of said devices.

4. In an indicating mechanism for spring motors, the combination of a spring; a winding mechanism for said spring; a wheel connected with the winding mechanism; means driven by the spring; a wheel connected with said driven means; a cam on one of said wheels; and indicating devices carried by the other of said wheels actuated by said cam as said wheels move relatively.

5. In an indicating mechanism for spring motors, the combination of a spring; a gear for winding said spring; a gear driven by said spring, said gears being in axial alinement; two shafts arranged parallel to the axis of said gears, the gear on one shaft meshing with the driven gear, the gear on the other shaft meshing with the winding gear; worms on said shafts; worm gears meshing with said worms, said gears being in axial alinement; a lever pivotally mounted on one of said gears; a cam arranged in the other of said gears and operating on said lever; and means for indicating the movement of the lever.

6. In an indicating mechanism for spring motors, the combination of a spring; a gear for winding said spring; a gear driven by said spring, said gears being in axial alinement; two shafts arranged parallel to the axis of said gears, the gear on one shaft meshing with the driven gear, and the gear on the other shaft meshing with the winding gear; worms on said shafts; worm gears meshing with said worms, said gears being in axial alinement; a lever pivotally mounted on one of said gears; a cam arranged in the other of said gears and operating on said lever; a bell crank arm on said lever leading to the axis of said worm gear; an indicating device; and a universal connection to the bell crank at the axis for communicating the movement of the lever to the indicating device.

In testimony whereof I have hereunto set my hand.

VINCENT V. VEENSCHOTEN.